United States Patent [19]

Schonhorn et al.

[11] 3,945,112

[45] Mar. 23, 1976

[54] TECHNIQUE FOR FABRICATION OF FOIL ELECTRET

[75] Inventors: Harold Schonhorn, New Providence; Gerhard Martin Sessler, Summit; James Edward West, Plainfield, all of N.J.

[73] Assignee: Bell Telephone Laboratories, Incorporated, Murray Hill, N.J.

[22] Filed: Mar. 21, 1975

[21] Appl. No.: 560,689

[52] U.S. Cl. ....... 29/592; 179/111 E; 179/100.41 B; 156/6; 307/88 ET; 427/100; 427/123; 427/124; 427/125; 427/250; 427/299; 427/337; 427/404

[51] Int. Cl.² ............................................. H01S 4/00

[58] Field of Search .......... 29/592, 592 E, 594, 195, 29/25.41, 25.42, 625, 624; 317/262; 307/88 ET; 179/111 E, 100.41 B; 340/173 PP; 161/216; 204/20, 30, 35, 15; 427/79, 80, 100, 123, 125, 250, 301, 304–307, 309, 299, 404, 270, 271, 58, 77, 78; 156/2, 3, 6, 22; 264/129, 22

[56] References Cited

UNITED STATES PATENTS

| 3,514,538 | 5/1970 | Chadwick et al. | 29/628 X |
|---|---|---|---|
| 3,625,758 | 12/1971 | Stahl et al. | 29/625 X |
| 3,632,443 | 1/1972 | Koofra | 307/88 ET X |
| 3,644,605 | 2/1972 | Sessler et al. | 264/22 |
| 3,706,131 | 12/1972 | Van Turnhout | 29/592 |
| 3,711,941 | 1/1973 | Sessler et al. | 29/592 |
| 3,858,307 | 1/1975 | Yoshimura et al. | 29/592 X |

*Primary Examiner*—Milton S. Mehr
*Assistant Examiner*—Joseph A. Walkowski
*Attorney, Agent, or Firm*—E. M. Fink

[57] ABSTRACT

A technique for the fabrication of thin film electrets designed for use in electroacoustic transducers involves depositing a thin film of aluminum or titanium upon a perfluorinated foil and etching away the film prior to deposition of gold. The resultant structure evidences superior adhesion characteristics and electrical characteristics comparable to those previously described.

6 Claims, 3 Drawing Figures

TECHNIQUE FOR FABRICATION OF FOIL ELECTRET

This invention relates to a technique for the fabrication of a metallized thin film foil-electret and to the electret so produced. More particularly, the present invention relates to a technique for the fabrication of a thin film foil electret comprising a fluorinated polymer having deposited thereon a thin film of gold, and to the electret so produced.

During the past few years a rebirth of interest has occurred in a class of structures commonly termed "foil electrets", such structures being suitable for use in electrometers, dosimeters, and most significantly, as the vibratile diaphragm of electroacoustic transducers. The diaphragm in such structures has heretofore been comprised of a metallized (typically aluminum) thin foil of a fluorinated ethylene-propylene copolymer or polytetrafluoroethylene, such compositions being marketed commercially under the tradename of "Teflon FEP" or "Teflon TFE", respectively. The metallized foil is converted into an electret by any well-known technique prior to the fabrication of a transducer or any of the above noted devices. Studies of such electret structures have revealed that air oxidation of the aluminum often caused corrosion, a phenomenon which typically results in contact failure over large sections resulting in large insensitive areas. Emphasis was then shifted to gold, a metal which ordinarily does not adhere well to Teflon, such being attributed to the presence of surface regions of low mechanical strength in the fluorinated polymer.

More recently a technique was described for fabricating a perfluorinated foil electret having a layer of gold deposited thereon which involved bombarding one surface of a perfluorinated foil with an electron beam of specified energy and intercepted charge density, depositing gold upon the bombarded surface, charging the uncoated surface of the polymer and baking the metallized foil electret. Electrets prepared in accordance with this procedure were found to evidence limited and reversible damage in charge storage properties of the polymer while retaining excellent adherency characteristics.

Although the foregoing procedure has been satisfactory from the standpoint of joint strength and charge retention behavior, workers in the art sought to develop simpler processes which might obviate the necessity of employing irradiation and heat treatment.

In accordance with the present invention, this end has been attained by a novel technique wherein a thin film of a metal is initially deposited upon a perfluorinated foil by conventional vacuum evaporation techniques, subsequently removed therefrom by dissolution in a solvent and a layer of gold deposited upon the surface of the foil. Studies have revealed that the tensile shear strength of the resultant metallized foil approaches the cohesive strength of polytetrafluoroethylene while preserving the electrical characteristics thereof.

The invention will be more fully understood by reference to the following detailed description taken in conjunction with the accompanying drawing wherein.

The first step in the fabrication of a thin film electret in accordance with the present invention involves depositing a thin film of a metal upon one surface of a sample of a perfluorinated polymer, typically fluorinated ethylene-propylene copolymer or polytetrafluoroethylene. Metals suitable for use in the practice of the present invention must be capable of being deposited upon the polymer surface and be readily removable without significantly modifying the physical surface of the polymer while effecting a chemical modification of the surface. Studies have revealed that metals suitable for this purpose are titanium and aluminum.

In the operation of the process, nonmetallized perfluorinated polymer films are cut into circular samples and framed between cardboard rings for convenience in handling. The samples are then mounted in any conventional thin film evaporation apparatus and a thin film of a metal of at least monolayer thickness is deposited thereon. Although thickness is not critical, a general preference exists for films having a thickness within the range of 10–1000 Angstroms. It has been found that at least 10 Angstroms of metal is required to get satisfactory surface coverage whereas films in excess of 1000 Angstroms tend to be in a state of tension or compression and unsuitable for device purposes. Evaporation is effected by any conventional evaporation process.

Following, the coated films are immersed in an etchant suitable for removing the metal coating from the fluoropolymer. Etchants suitable for this purpose include either dilute bases such as sodium hydroxide and the like or dilute acids such as hydrochloric acid and the like. The samples so etched are then washed and dried and prepared for gold evaporation.

This end is attained by again mounting the sample in the evaporation chamber and thereafter dopositing a thin film of gold having a thickness within the range of 500–5000 Angstroms thereon to serve as one electrode of the desired electret. The thickness of the gold film is not critical for most applications and is determined solely on continuity considerations.

Composites of gold-Teflon (fluoropolymer) or aluminum-Teflon (fluoropolymer) for joint strength measurements are formed by cutting strips from the circular Teflon samples and joining both sides by means of a conventional epoxy adhesive to aluminum pieces which have been chemically etched. The composites are bonded at 70°C in a device capable of maintaining a 1.25 cm overlap. Following curing of the epoxy, the composites are tested for joint strength in an Instron in accordance with ASTM D1002-64.

The adhesive joint strengths for various composites are shown in the Table set forth below:

TABLE

SURFACE REGION MODIFICATION OF TEFLON FEP BY METAL DEPOSITION

Figure 1:
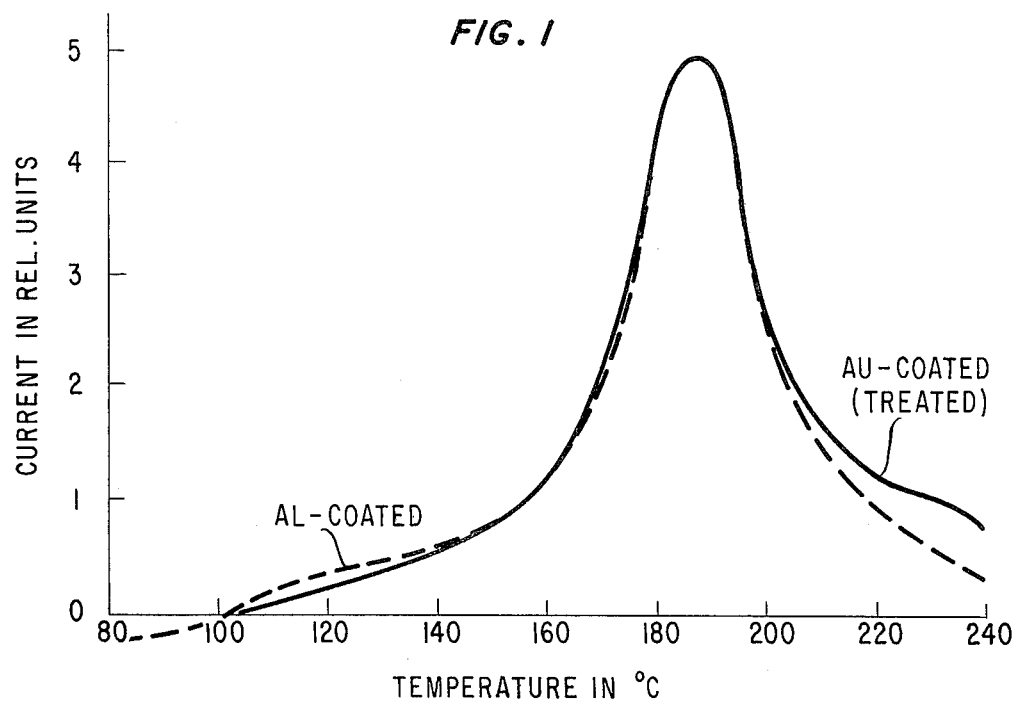
FIG. 1 is a graphical representation on coordinates of temperature in degrees centigrade against current in relative units showing thermally stimulated current characteristics for treated and untreated Teflon foil samples having aluminum or gold coatings.

| Film | Tensile Shear Strength of Composite in FIG. 1 (Kg/cm²) |
|---|---|
| 1. Teflon FEP (as received, no metallization) | ~0 |
| 2. Teflon FEP (untreated except for sufficient exposure to dil. NaOH which is required to dissolve aluminum, no metallization) | ~0 |
| 3. Teflon FEP (1000 A gold deposited) | ~0 |
| 4. Teflon FEP (1000 A aluminum deposited) | 94 |
| 5.* Teflon FEP (1000 A film of aluminum dissolved from substrate by dil. NaOH) | 124 |
| 6. Teflon FEP (after removal of Al from above, 1000 A of gold deposited) | 83 |

*No aluminum detected on Teflon FEP by X-ray fluorescence.

The data shown indicate that the joint strengths for evaporated gold-Teflon FEP composites are essentially zero. A considerable enhancement of the joint strength results when aluminum is deposited by evaporation onto previously untreated Teflon FEP, so suggesting that aluminum deposition causes a surface modification of the fluoropolymer during deposition. Removal of aluminum followed by the deposition of gold yields joint strengths of about 80 kg/cm², such being in excess of those previously reported.

The electrical properties of the described samples are evaluated after charging by any well-known technique. This end may conveniently be effected by mounting the sample in an electron bombardment chamber and bombarding the structure with a focused and scanned monoenergetic beam operating in the range of 10–40 keV for intervals of from 1–10 seconds in a vacuum while maintaining a current density of a time interval selected to yield a current time product within the range of $10^{-8}$ to $2 \times 10^{-7}$ A sec/cm². After charging, the samples may be removed from vacuum for the performance of thermally-stimulated current (TSC) experiments. Data are obtained by heating the charged samples in open circuit (between evaporated electrode and second electrode at 0.5 cm distance from the polymer face of the sample) while applying a linear heating rate of 1°C per minute. The TSC peaks for the gold coated (after aluminum evaporation and removal) and control samples (aluminum coated) are both found at about 190°C as seen in FIG. 1, such having been previously observed for untreated negatively charged Teflon. Teflon samples coated with sputtered gold or samples subjected to glow discharge and then gold coated evidence peak temperatures within the range of 130–150°C, so indicating differences in electrode properties from those described herein. The charge retention characteristics and the TSC behavior indicate that the electrical properties of films prepared as described herein are equivalent to those in which aluminum is evaporated on Teflon.

Evaluation of the surface composition of deposited films prepared as described herein and by prior art processes is determined by X-ray photodetection spectroscopy using a Varian V1EE-15 spectrometer system with Mg Kα radiation (1253.6 ev) as the excitation source. The pressure in the spectrometer during measurements was $\sim 10^{-2}$ torr. at a temperature of about 35°C. Sample preparation involved depositing a 1000 Angstroms thick layer of either vacuum evaporation gold or aluminum upon one side of a 25 μm thick Teflon FEP sample. The metal was then removed from the polymer by immersion in mercury (for gold) or 0.1 N sodium hydroxide (for aluminum). The films were examined in the spectrometer after being mounted on cylindrical holders with double sided tape.

Figure 2:
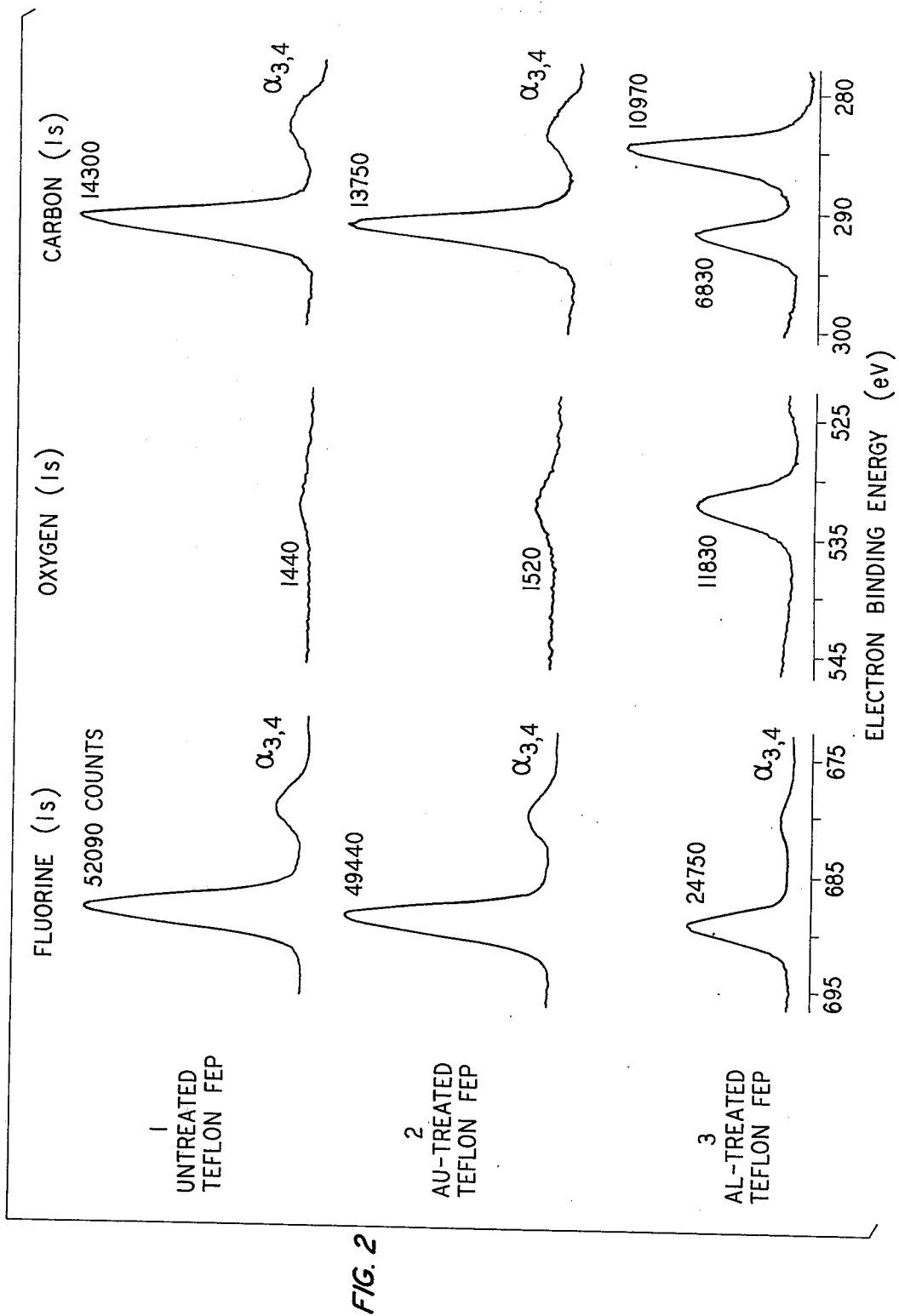
FIG. 2 is a representation of the electron spectra of aluminum treated Teflon, gold treated Teflon and untreated Teflon showing the surface characteristics of various foils.

Fluorine, oxygen and carbon electron spectra of various Teflon FEP samples is shown in FIG. 2. Line 1 of the figure shows that untreated Teflon gives rise to intense fluorine and carbon photolines at about 689 and 292 ev, respectively. The high carbon binding energy reflects the highly electronegative fluorine environment of carbon atoms in Teflon FEP.

Analysis of line 2 reveals the absence of gold and mercury signals in the gold treated FEP Teflon, so indicating that neither of these elements were retained in the surface region.

Comparison of the electron spectra of aluminum treated Teflon FEP (line 3) with untreated Teflon FEP (line 1) reveals that both the fluorine and carbon signals of line 3 at about 689 and 292 ev have diminished in intensity by about 50 percent, while broad oxygen and carbon photolines at about 532 and 285 ev have appeared.

Based upon the foregoing, it is evident that a significant amount of fluorine is being lost from the surface region of Teflon during the aluminum treatment, so suggesting the introduction of unsaturation which would account for the enhancement of joint strength.

Figure 3:
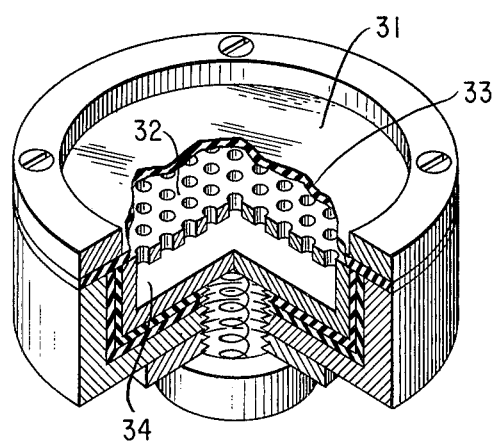
FIG. 3 is a sectional view of an electrostatic acoustic transducer including a thin film foil-electret prepared in accordance with the invention.

Following treatment, the prepared electret may be used in the fabrication of an electroacoustic transducer of a type depicted in FIG. 3.

With reference now more particularly to FIG. 3 there is shown a sectional view of electroacoustic transducer including a thin thilm electret of the type prepared in accordance with the invention. Shown in FIG. 3 is an electrically charged perfluorinated film 31 stretched over a metal backplate 32. Film 31 typically comprises a perfluorinated ethylene-propylene copolymer (Teflon FEP) or polytetrafluoroethylene (PTFE) of a thickness of about 0.001 inch. Shown deposited upon the upper surface of film 31 is a thin layer 33 of gold deposited thereon by the above-described techniques. The metallized polymer film is charged and is commonly referred to as a metallized foil electret. The backplate surface is typically arranged so that the foil contacts its surface at discrete points or along discrete lines only. In those areas where contact is not made, shallow air pockets permit vibration of the foil upon impingment of sound waves thereon. Backplate 32 is perforated and supported above an air cavity 34. This arrangement reduces the stiffness of the air cushion behind the diaphragm and permits vibration of the film with a greater amplitude, thereby increasing transducer sensitivity.

It will be appreciated by those skilled in the art that the present invention is not limited to the fabrication of foil electrets and may be used in the fabrication of gold metallized foils suitable for diverse applications in which excellent electrical properties are desired. It will also be appreciated that an automatic system can be implemented that would allow long strips of material to be fabricated using this method.

What is claimed is:

1. Technique for the fabrication of a foil electret which comprises the steps of depositing a layer of gold on the surface of a perfluorinated foil and charging the non-gold coated face of said foil, the improvement which comprises depositing a thin film of a metal selected from the group consisting of aluminum and titanium on the surface of said foil and removing the thin film with a solvent prior to deposition of the gold layer.

2. Technique in accordance with claim 1 wherein said thin film ranges in thickness from 10–1000 Angstroms.

3. Technique in accordance with claim 1 wherein said foil is polytetrafluoroethylene.

4. Thin film foil electret prepared in accordance with the procedure of claim 1.

5. Technique in accordance with claim 1 wherein deposition of the thin film is effected by evaporation.

6. Technique in accordance with claim 3 wherein said thin film is aluminum and said solvent is dilute sodium hydroxide.

* * * * *